July 13, 1954 J. H. STAAK 2,683,828
BRUSH HOLDER ASSEMBLY
Filed Jan. 31, 1952
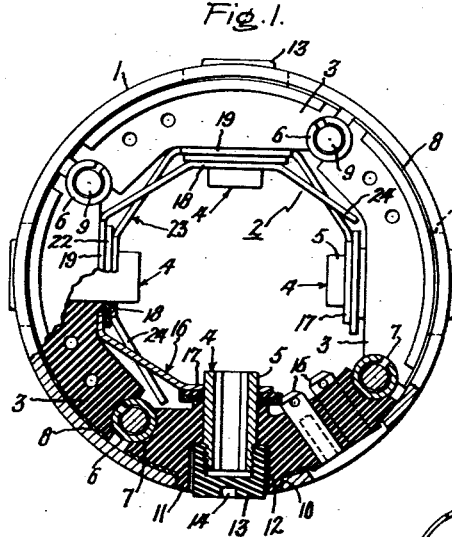
Fig. 1.
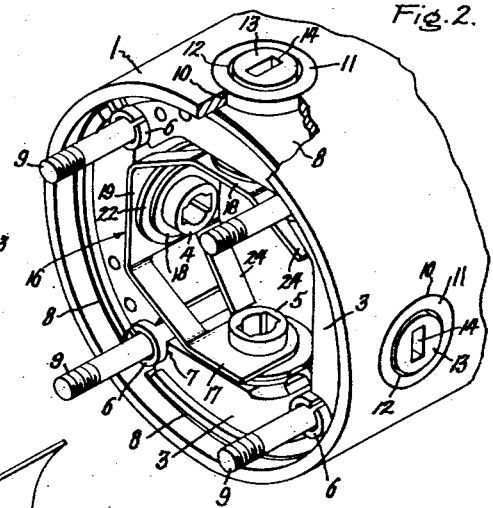
Fig. 2.
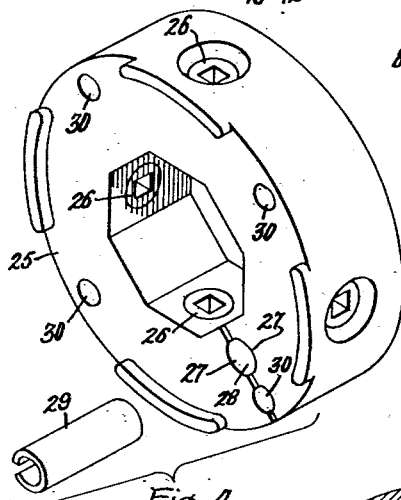
Fig. 3.
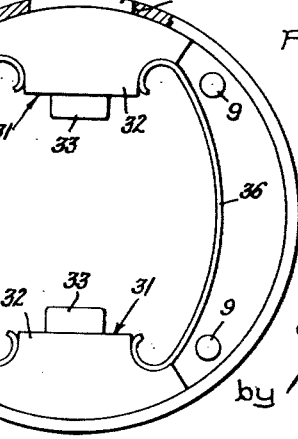
Fig. 4.
Fig. 5.
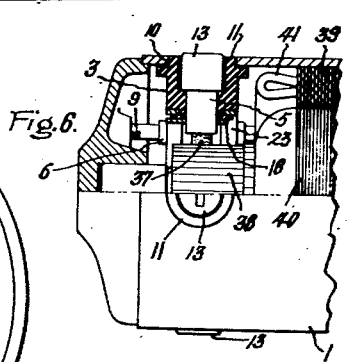
Fig. 6.
Inventor:
Juluis H. Staak,
by Browell P. Mack
His Attorney.

UNITED STATES PATENT OFFICE 2,683,828

BRUSH HOLDER ASSEMBLY

Julius H. Staak, Fort Wayne, Ind., assignor to General Electric Company, a corporation of New York Application January 31, 1952, Serial No. 269,278

9 Claims. (Cl. 310—239)

This invention relates to brush holder assemblies for commutator type dynamoelectric machines.

Commutator type dynamoelectric machines are provided with a plurality of stationary brushes which electrically contact the commutator of the armature winding. In the conventional type of machine, the armature and commutator rotate within a stationary frame and the brushes are arranged in brush holders mounted on the frame and electrically insulated therefrom. In the design of commutator type dynamoelectric machines in the fractional horsepower frame sizes, it has been the practice to mount the brush holders, which are generally tubular in form, in the end flange of the machine. In certain designs however, particularly in the case of commutator type dynamoelectric machines used for aircraft applications, it may not be possible or desirable to mount the brush holders in an end flange and they must therefore be arranged within the main frame of the machine, which in most aircraft designs is formed as a cylindrical shell. In addition to the space limitation always present in equipment designed for aircraft application, it is necessary that this brush holder mechanism be readily removable in order to permit maintenance access to the interior of the machine and removal of the armature.

It is therefore an object of this invention to provide an improved brush holder assembly for a commutator type dynamoelectric machine.

This invention in its broadest aspect contemplates a brush holder member arranged within the shell of a dynamoelectric machine and biased against the interior surface of the shell by expanding means. One embodiment of this invention contemplates an annular brush holder assembly positioned within the cylindrical shell member of a dynamoelectric machine, this assembly comprising a plurality of segments, each segment including a mounting member formed of insulating material and a brush holder arranged therein. Expanding means, such as split tubes formed of resilient material, are arranged between the segments and expand the segments into tight engagement with the inner surface of the shell member. The through bolts which hold the various elements of the machine in assembled relation may pass through the split tubes. The extensions of the brush holder tubes which project inwardly from the mounting members may be electrically interconnected by suitable bus connections. Projections may be formed on the outer surface of the mounting members which register with and are arranged in openings in the shell member in order to restrain the mounting members from rotation within the shell.

In an alternative construction, the brush holder assembly is formed as a split annular member formed of resilient material with a plurality of brush holders extending therethrough, this member being arranged within the cylindrical shell member of the machine. In this embodiment, a single split tube formed of resilient material is arranged between the ends of the brush holder member to expand it into tight engagement with the inner surface of the shell member.

In a still further embodiment of this invention, two brush holder assemblies are provided arranged within the shell member of the machine, each comprising a mounting member with a brush holder tube arranged therein. Spring members are interposed between the adjacent ends of the mounting members to bias the mounting members into engagement with the inner surface of the shell member of the machine and here again projections may be formed on the outer surfaces of the mounting members which are positioned in openings in the shell member.

In any of the foregoing embodiments, wedge members may be used as the expanding means. A suitable resilient asssembly may be obtained by interposing resilient gaskets formed of suitable material such as rubber or neoprene between the brush holder members and the shell.

Further objects and advantages of this invention will become apparent and the invention will be better understood by reference to the following description and the accompanying drawing, and the features of novelty which characterize this invention will be pointed out with particularity in the claims annexed to and forming a part of the specification.

In the drawing, Fig. 1 is an end view, partially broken away, of an embodiment of this invention; Fig. 2 is a view in perspective of the embodiment of Fig. 1; Fig. 3 is a fragmentary exploded view of certain of the elements of Figs. 1 and 2; Fig. 4 is a fragmentary view in perspective of a modification of this invention; Fig. 5 is an end view, partly in section, showing a further modification of this invention; and Fig. 6 is a side elevational view, partly in section, of a commutator type dynamoelectric machine equipped with the improved brush holder mechanism of this invention.

Referring now to Figs. 1, 2 and 3, there is shown an outer cylindrical shell member 1 for a dynamoelectric machine with an annular brush holder assembly 2 arranged therein. The brush holder assembly 2 comprises four segments each including a mounting member 3 formed of molded insulating material and having an outer surface formed to conform to the inner surface of the shell member 1, and a brush holder tube 4 arranged in an opening formed in the mounting member 3 and having a projection 5 extending radially inward. The brush holder tubes 4 accommodate suitable brushes (not shown) for longitudinal movement inwardly to contact a commutator (not shown). The four segments comprising the brush holder assembly 2 are held in assembled relation within the shell member 1 by means of four split tubes 6 formed of a resilient material. These tubes are arranged in axially extending semicircular grooves 7 formed in the adjacent ends of the mounting members 3 and expand the segments of the brush holder assembly 2 into tight engagement with the inner surface of the shell member 1. In order to provide sufficient resiliency in the assembly and to keep tolerances to a reasonable value, it may be found desirable to interpose rubber gaskets 8, formed, for example, of thin rubber or neoprene, between the mounting members 3 and the shell 1.

It will be readily seen that the split tubes 6 conveniently accommodate through bolts 9 which are used to hold the various elements of the machine in assembled relation. The shell member 1 may be provided with a plurality of circumferentially spaced apart openings 10 in which projections 11 of the mounting members 3 are positioned in order to restrain the mounting members 3 from rotary motion within the shell 1. The projections 11 have a recess 12 formed therein into which a threaded extension of the brush holder tube 4 projects. A cap member 13, which may have a screwdriver slot 14 formed in its upper surface, threadingly engages the threaded extension of the brush holder tube 4. Terminals 15 may be molded into one of the mounting members 3 for making the external connections to the machine.

In order suitably to electrically interconnect the brush holder tubes 4, which are, of course, formed of conductive material, bus members 16 and 23 are provided each having two end portions 17 and 18 and a central portion 19. It will be readily seen that the end portions 17 and 18 of bus member 16 are provided with openings 20 which embrace and electrically contact the extensions 5 of two opposite brush holders 4 while the center portion 19 is provided with an opening 21 which embraces a boss on mounting member 3, through which extension 5 of one of the other two brush holders 4 protrudes, and is insulated from bus 23 by means of washer 22. Likewise, the other bus member 23 has its end portions 17 and 18 embracing and connecting the other two extensions 5 of the brush holders 4 with end portion 18 embracing the same brush holder tube extension as the center portion 19 of the bus member 16. The center portion 19 of the bus member 23 embraces but does not electrically connect the same brush holder tube extension as the end portion 18 of the bus member 16. The bus members 16 and 23 are provided with extensions 24 which may be used for making connections to the terminals 15. Bus members 16 and 23 are held in assembled relation by their inherent resilience and tendency to spring outwardly.

In order to assemble the arrangement shown in Figs. 1, 2 and 3, a preassembly is made of three of the four brush holder segments and the assembly is collapsed to permit entry into the shell 1. When the projections 11 of each of the three segments register with the openings 10 in the shell 1, the assembly is expanded and the fourth segment slipped into place. The entire assembly is then locked into tight engagement with the inner surface of the shell member 1 by inserting the split tube lock pins 6. It will be readily understood that the split tube member 6 should be spring tempered to provide a constant expanding force to hold the assembly in the shell.

It will also be readily apparent that in the event that the through bolts 9 are not utilized, or if utilized but passed through other openings in the mounting members 3, other resilient means, or expanding means, such as solid tubes or wedges, may be used to expand the segments 3 into engagement with the inner surface of the shell 1, with the resiliency being obtained by a rubber or neoprene gasket 8 between the brush holder and the shell. Through bolts may still pass through the grooves 7 with the proper arrangement of flat wedges.

Referring now to Fig. 4, there is shown a modification of this invention utilizing an annular split brush holder mounting ring 25, formed of molded insulating material in which brush holder tubes 26 formed of conductive material are arranged. Here, axially extending semicircular grooves 27 are formed in the adjacent edges of the split in member 25, thus defining an aperture 28. The assembly is expanded into tight engagement with the inner surface of the shell member 1 by means of the split tube expansion pin 29. While openings 30 are shown formed in the member 25 to accommodate the through bolts 9, it will be readily understood that one of the bolts could be passed through the split tube member 29. In this modification, the projections 11 of Figs. 1, 2 and 3 are omitted so that the assembly will slide into the shell 1. It will be readily understood that bus members as shown in Figs. 1, 2 and 3 may be utilized with this embodiment or the brush holder tubes may be suitably connected by wire bus connections.

Referring now to Fig. 5, there is shown a further modification of this invention in which brush holder assemblies 31 are arranged within the shell 1, each comprising a mounting member 32 formed of molded insulating material in which a brush holder tube 33 is arranged. The outer surfaces of the mounting member 32 are curved to conform to the inner surface of the shell member 1 and may be provided with projections 34 positioned in openings 35 in the shell member 1. The mounting members 32 are held into tight engagement with the inner surface of the shell member 1 by means of two arcuate springs 36 interposed between the mounting members 32 and biasing the members against the inner surface of the shell member 1. It will be seen that this arrangement easily accommodates the through bolts 9 and the springs 36 will straddle the commutator of the machine (not shown).

Referring now to Fig. 6, there is shown the manner in which the improved brush holder mechanism of this invention cooperates with the other elements of a commutator type dynamo-electric machine. Here, armature 40 having commutator 38 is rotatably positioned within stator core member 39 on which field coil 41 is arranged. The stator core member 39 is in turn mounted within the shell member 1. The brush holder assembly including the brush holder member 3 is also arranged within the shell 1 surrounding and concentric with the commutator 38 and is biased outwardly against the interior surface of the shell 1 in any of the manners described hereinbefore. The brush 37 is arranged for longitudinal movement within the brush tube 5 and is biased into engagement with the commutator 38 by suitable spring means (not shown) within the brush tube 5.

It will be readily understood that while the improved brush holder arrangement of this invention is described as being installed in a shell member, it may also be installed in an end flange of the machine and the term "shell member" as used herein therefore refers to any encasing frame member.

It will now be readily apparent that this invention provides an improved and simplified brush holder assembly characterized by its ease of assembly and disassembly and by the minimum space occupied.

While I have shown and described particular embodiments of this invention, further modifications and improvements will occur to those skilled in the art. I desire it to be understood, therefore, that this invention is not limited to the forms shown and I intend in the appended claims to cover all modifications which do not depart from the spirit and scope of this invention.

What I claim as new and desire to secure by Letters Patent of the United States is:

1. In a dynamoelectric machine having a cylindrical outer shell member, a pair of brush holder assemblies positioned within said shell member each comprising a mounting member formed of insulating material and a brush holder tube secured thereto, said mounting members respectively having curved outer surfaces conforming to the inner surface of said shell member, and a pair of arcuate springs respectively interposed between said mounting members to bias the same against the inner surfaces of said shell member.

2. In a dynamoelectric machine having an outer shell member, a plurality of brush holder assemblies positioned within said shell member each comprising a mounting member formed of insulating material and a brush holder tube, and resilient means respectively positioned between adjacent ends of said mounting members to force said ends apart and thereby expand said mounting member into tight engagement with the inner surface of said shell member.

3. In a dynamoelectric machine having a cylindrical outer shell member, an annular brush holder assembly positioned within said shell member comprising a plurality of segments, each of said segments comprising a mounting portion formed of insulating material and a brush holder tube secured thereto, and a plurality of resilient means positioned between said mounting members respectively to expand said segments into tight engagement with the inner surface of said shell member.

4. In a dynamoelectric machine, a shell member having a plurality of circumferentially spaced-apart openings formed therein, a plurality of brush holder members positioned within said shell member, each of said brush holder members having a projection formed on its outer surface, said projections being respectively positioned in said shell member openings, and expanding means respectively positioned between adjacent ends of said brush holder members to force said ends apart and thereby expand said member into tight engagement with the inner surface of said shell member.

5. In a dynamoelectric machine having a shell member, four brush holder assemblies positioned with said shell member and defining a central opening, each of said assemblies comprising a mounting member formed of resilient insulating material and a brush holder tube formed of conducting material extending through said mounting member and projecting inwardly therefrom into said central opening, expanding means repsectively arranged between adjacent ends of said mounting members to expand said members into tight engagement with said shell member, and a pair of bus members formed of conducting material respectively positioned within said central opening, one of said bus members having two end openings respectively embracing and contacting two opposite brush holder tube projections and a central opening embracing and insulated from one of the other two brush holder tube projections, the other of said bus members having two end openings respectively embracing and contacting said other two opposite brush holder tube projections and a central opening embracing and insulated from one of said first two brush holder tube projections.

6. In a dynamoelectric machine having an outer shell member, a plurality of brush holder members arranged within said shell member, adjacent ends of said brush holder members respectively having axially extending semicircular grooves formed therein, each pair of adjacent grooves defining an aperture, and a plurality of resilient split tubes respectively positioned lengthwise in said apertures expanding outwardly to force said brush holder members into tight engagement with the inner surface of said shell member.

7. In a dynamoelectric machine having a cylindrical outer shell member, an annular brush holder member positioned within said shell member and comprising a plurality of segments, the adjacent ends of said segments respectively having axially extending semicircular grooves formed therein, each pair of adjacent grooves defining an aperture, and a plurality of resilient split tubes respectively positioned lengthwise in said apertures expanding outwardly to force said segments into tight engagement with the inner surface of said shell member.

8. In a dynamoelectric machine having an outer shell member, a plurality of brush holder assemblies positioned within said shell member each comprising a mounting member formed of insulating material and a brush holder tube member secured thereto, the adjacent ends of said mounting members respectively having axially extending semicircular grooves formed therein, each pair of adjacent grooves defining an aperture, and a plurality of split tube members formed of resilient material respectively positioned lengthwise in said apertures and expanding outwardly to force said mounting members into tight engagement with the inner surface of said shell member.

9. In a dynamoelectric machine having an outer shell member with a plurality of through bolts extending axially within said shell member for holding elements of said machine in assembled relation, a plurality of brush holder members positioned within said shell member, the adjacent ends of said brush holder members respectively having axially extending semicircular grooves formed therein, each pair of adjacent grooves defining an aperture, and a plurality of split tubes formed of a resilient material respectively positioned lengthwise in said apertures and expanding outwardly to force said brush holder members into tight engagement with the inner surface of said shell member, said through bolts respectively passing through said split tubes.

References Cited in the file of this patent

UNITED STATES PATENTS

| Number | Name | Date |
|---|---|---|
| 670,119 | Trier | Mar. 19, 1901 |
| 1,206,907 | Peters | Dec. 5, 1916 |
| 1,686,324 | Hillix | Oct. 2, 1928 |
| 2,246,270 | Staak | June 17, 1941 |
| 2,502,121 | Beard | Mar. 28, 1950 |
| 2,535,004 | Willits | Dec. 19, 1950 |

FOREIGN PATENTS

| Number | Country | Date |
|---|---|---|
| 113,686 | Great Britain | Mar. 7, 1918 |
| 595,083 | France | July 10, 1925 |